United States Patent [19]

Martinsons et al.

[11] Patent Number: 4,704,685

[45] Date of Patent: Nov. 3, 1987

[54] FAILSAFE ENGINE FUEL CONTROL SYSTEM

[75] Inventors: Robert Martinsons, Chicago; Robert W. Deutsch, Sugar Grove, both of Ill.

[73] Assignee: Motorola, Inc., Schaumburg, Ill.

[21] Appl. No.: 692,795

[22] Filed: Jan. 18, 1985

Related U.S. Application Data

[63] Continuation-in-part of Ser. No. 366,956, Apr. 9, 1982, abandoned.

[51] Int. Cl.[4] ....................... F02D 41/22; F02D 41/34; F02M 51/00; G05D 17/02

[52] U.S. Cl. ................................ 364/431.11; 123/479

[58] Field of Search .................. 364/431.11; 123/479; 340/52 F

[56] References Cited

U.S. PATENT DOCUMENTS

| | | | |
|---|---|---|---|
| 4,255,789 | 3/1981 | Hartford et al. | 364/431.06 |
| 4,271,402 | 6/1981 | Kastura et al. | 364/431.11 X |
| 4,274,381 | 6/1981 | Abo | 123/479 |
| 4,287,503 | 9/1981 | Sumida | 340/52 F |
| 4,328,578 | 5/1982 | Bell | 370/100 |
| 4,395,905 | 8/1983 | Fujimori et al. | 123/479 X |
| 4,408,584 | 10/1983 | Yabuhara et al. | 123/479 X |
| 4,410,938 | 10/1983 | Higashiyama | 364/431.11 X |
| 4,425,889 | 1/1984 | Hachitani et al. | 123/479 X |
| 4,430,979 | 2/1984 | Shikata | 123/479 |
| 4,450,812 | 5/1984 | Otsuka et al. | 123/479 X |

FOREIGN PATENT DOCUMENTS

| | | | |
|---|---|---|---|
| 57-51923 | 3/1982 | Japan | 123/479 |

OTHER PUBLICATIONS

Bowler: Throttle Body Fuel Injection: an Integrated Engine Control System, Automotive Engineering, vol. 88, No. 10, Oct. 1980, pp. 102-110.

Walters: Electronic Emission Control diagnoses its own problems, Automotive Engineering, vol. 88, No. 8, Aug. 1980, pp. 43-48.

Czadzeck & Reid: Fords 1980 Central Fuel Injection Systems, Society of Automotive Engineers, Article SAE, 790742, p. 34 in Book, SP 477, Implementation of Engine Control Strategies with Electronics, p. 34.

Russo and Pauwels, EFI for the 80's—A Base Model Fuel Control System. SAE 830422, in SAE Book SP540, Electronic Engine/Drivetrain Control, Feb. Mar, 1983, p. 15.

*Primary Examiner*—Felix D. Gruber

*Attorney, Agent, or Firm*—Phillip H. Melamed

[57] ABSTRACT

A failsafe engine fuel control system is disclosed in which a primary control signal, normally a direct function of an engine manifold pressure sensor signal, is utilized by an electronic engine control microprocessor to calculate control signals for engine fuel injectors and engine spark apparatus. Pressure sensor failure detection apparatus is provided which, in the event of the engine manifold pressure sensor signal being non-representive of actual engine manifold pressure, results in making the primary control signal utilized by the microprocessor a direct function of at least an analog sensor signal representative of engine throttle position rather than engine manifold pressure. Preferably, in the event of a pressure sensor failure the primary control signal is calculated as a function of both a throttle position signal and an engine speed signal.

17 Claims, 5 Drawing Figures

FAILSAFE ENGINE FUEL CONTROL SYSTEM

CROSS REFERENCE TO RELATED APPLICATION

The present application is a continuation-in-part of copending U.S. patent application Ser. No. 366,956, filed Apr. 9, 1982, entitled, "Failsafe Engine Fuel Control System", now abandoned.

BACKGROUND OF THE INVENTION

The present invention generally relates to the field of engine fuel control systems which control fuel primarily in accordance with the magnitude of a primary control signal, and more particularly wherein said primary control signal is normally a direct function of sensed engine manifold pressure and is utilized by an engine control microprocessor.

Several prior engine fuel control systems exist in which an electronic engine control microprocessor provides engine fuel injector control signals in accordance with a received primary control signal representative of sensed engine manifold pressure. Typically, these systems cannot properly control engine fuel in the event of a failure of the engine manifold pressure sensor itself or a failure of the primary control signal received by the microprocessor to accurately represent the actual engine manifold pressure. In other words, if either the manifold pressure sensor fails to produce any output signal or if the primary control signal is not directly related to the engine manifold pressure, then the prior engine fuel control systems do not function properly.

Some prior engine fuel control systems have suggested the substitution of a set of expected values of manifold absolute pressure (MAP) in the event of a detected failure of the engine manifold pressure sensor. These prior systems contemplate the substitution of one of two different expected values of engine pressure as a function of the closed throttle switch, wherein this switch merely indicates if the engine throttle is fully closed or not. Such systems have been found to operate unacceptably since in the event of a pressure sensor failure they result in extremely poor engine performance which severely impairs the drivability of automobiles driven by the engine. While the prior art systems therefore prevent a total engine failure in the event of a failure of the engine manifold pressure sensor, the performance of the engine is substantially impaired if the pressure sensor fails.

SUMMARY OF THE INVENTION

An object of the present invention is to provide an improved engine fuel control system in which improved engine operability is provided in the event of a pressure sensor failure. A more specific object of the present invention is to provide such an engine fuel control system which is readily adaptable for use with an engine control microprocessor.

In one embodiment of the present invention an engine fuel control system is disclosed, comprising: sensor means for providing separate more than two state electrical signals representative of the sensed engine parameters of engine throttle position and engine manifold pressure; fuel control means for receiving at least a primary control signal and providing a calculated engine fuel control signal as a function thereof; sensor signal conditioning circuit means coupled to said sensor means for receiving at least one of said electrical signals representative of sensed engine throttle position and sensed engine manifold pressure and providing, in response thereto, said primary control signal to said fuel control means; wherein the improvement comprises, failure detector means, included in said sensor signal conditioning circuit means, for determining when said engine manifold pressure sensor signal is non-representative of actual engine manifold pressure and providing a pressure sensor failure signal in response thereto, said sensor signal conditioning circuit means normally effectively providing a signal having magnitudes determined by at least said sensed manifold pressure signal to said fuel control means as said primary control signal in response to the absence of said pressure sensor failure signal, but effectively providing a different signal having magnitudes determined by at least said throttle position sensor signal, rather than said sensed manifold pressure signal, to said fuel control means as said primary control signal in response to the existence of said pressure sensor failure signal indicating a failure of the manifold pressure sensor, said different signal having high and low end magnitudes corresponding to high and low end magnitudes of said throttle position signal, and at least a middle range magnitude corresponding to a middle range magnitude of said throttle position signal, whereby in the event of a pressure sensor failure said primary fuel control signal will vary as a function of the throttle position signal rather than the manifold pressure sensor signal. Preferably said different signal is a function not only of throttle position, but also of engine speed.

Essentially, the present invention has recognized that the typical analog signals provided by the engine manifold pressure sensor and the engine throttle position sensor vary quite similarly during increases and decreases of engine throttle position with the exception that in some instances engine manifold pressure may decrease during a period of time that the engine throttle position remains constant. This latter effect is due to less engine manifold pressure being required when the throttle position remains constant and the throttle is less than wide open indicating the engine is run at a less than a full load capacity. In such circumstances when the engine obtains a nominal speed determined by the engine throttle position, the magnitude of the engine manifold pressure being sensed will decrease. Because of the similar relationships between throttle position and engine manifold pressure, the present invention proposes effective utilization of the engine throttle position signal in the event of a pressure sensor failure. This will, at most, result in a somewhat excessive amount of fuel being injected into the engine at some times due to the non engine load sensitivity of the signal now being utilized to represent the engine manifold pressure. However, this type of system still provides a vast improvement over prior art systems which apparently merely provide, in the event of a pressure sensor failure, one fixed value signal corresponding to an expected manifold pressure in response to the closure of the engine throttle switch, (indicating a closed throttle condition) and a different fixed value signal in the event of the non-closure of the engine throttle position switch. Also, preferably the substitute signal used as the primary control signal in the event of a pressure sensor failure is a function of not only a more than two state throttle position signal, but also a function of a signal representative of engine speed.

Preferably, the present invention utilizes a pressure sensor detection apparatus in which a pressure sensor failure is determined in response to the analog pressure sensor signal exceeding either a predetermined high or low threshold value limit for more than a predetermined time interval, wherein these high and low threshold limits represent extremes of engine manifold pressure which are not likely to be exceeded. Also, preferably, once a pressure sensor failure has been detected, the analog throttle position sensor signal will be utilized for determining the primary control signal regardless of the subsequent magnitude of the sensed manifold pressure sensor signal, thus effectively providing for a latch up of the failure detection means. In addition, it is contemplated that a warning device be provided to alert the operator of the engine that a manifold pressure sensor failure has been detected.

BRIEF DESCRIPTION OF THE DRAWINGS

For a more complete understanding of the present invention reference should be made to the drawings, in which.

FIGS. *3a* and *3b* comprise a composite flowchart for programing a microprocessor to implement the signal selection and failure detection functions accomplished by the control system shown in FIG. 1.

DESCRIPTION OF THE PREFERRED EMBODIMENT

Figure 1:
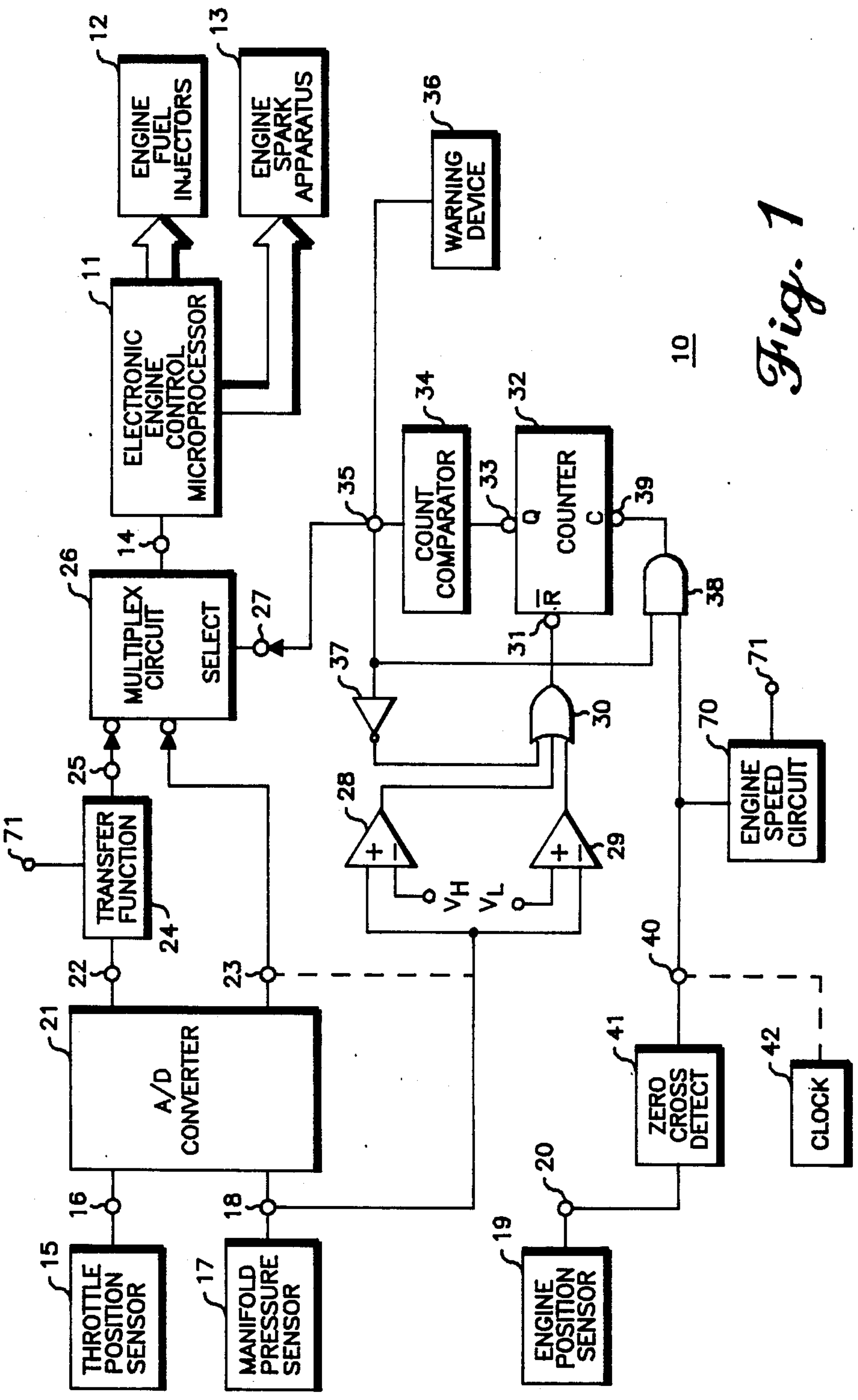
FIG. 1 is a schematic diagram of a fuel control system embodying the present invention.

FIG. 1 illustrates a failsafe engine fuel control system 10 which embodies the present invention. The system 10 shown in FIG. 1 represents a hardware embodiment for processing engine sensor signals and providing a resultant primary control signal to an electronic engine control microprocessor 11 that in turn calculates and supplies electrical control signals to engine fuel injectors 12 and an engine spark timing apparatus 13. The use of microprocessors such as the microprocessor 11 to provide control signals for controlling engine fuel injectors and engine spark timing apparatus is well known and does not form an essential part of the present invention. Thus the details regarding the construction of the microprocessor 11, engine fuel injectors 12 and engine spark timing apparatus 13 will not be discussed. It should be noted that, in its broadest sense, the present invention can utilize a discrete hardware engine fuel calculation and control circuit in place of the microprocessor 11, and such circuits are well known.

The essence of the fuel control system 10 of the present invention resides in its determination of a pressure sensor failure and its utilization of a more than two state throttle position sensor signal, rather than a pressure sensor signal, to determine a primary control signal provided at a terminal 14 which is coupled as an input to the microprocessor 11. It should be noted that preferably a portion of the microprocessor 11 can be programmed so as to accomplish the effective signal selection and failure detection functions of the present invention and that the flowcharts shown in FIGS. *3a* and *3b* represent typical programming of the microprocessor 11 so as to accomplish the same end result as the hardware embodiment shown in FIG. 1. Also the microprocessor can preferably implement any required analog to digital signal conversions, as well as any needed signal table look up functions including interpolations between stored set points.

A throttle position sensor 15 is illustrated in FIG. 1 and provides an analog electrical sensor signal at a terminal 16 having a magnitude representative of the sensed engine parameter of engine throttle position. Such engine throttle positions sensors are well known and typically comprise resistive potentiometers wherein the wiper arm of the potentiometer has its position varied in accordance with the engine throttle opening. Thus it is contemplated that the analog throttle position sensor signal at the terminal 16 will have at least high and low end magnitudes corresponding to throttle positions of wide open throttle and closed throttle and at least a middle range magnitude corresponding to some middle position of throttle between its open and closed positions.

In its broadest terms the signal at the terminal 16 is a more than two state signal (analog or digital) representative of throttle position, and therefore is quite distinct from a digital or analog two state signal, such as produced by a two position switch, having only two possible output states. The term "analog" as generally used herein refers to any digital or analog signal having more than two possible output states. The term "magnitude" as used herein refers to any measurable property of a signal including amplitude, frequency or phase.

The present invention contemplates an engine manifold pressure sensor 17 which provides an analog electrical signal at a terminal 18 having a magnitude representative of the sensed engine parameter of engine manifold absolute pressure (MAP). Engine manifold pressure sensors such as the sensor 17 are well known and can comprise any of a number of different types of sensors such as variable capacitance or resistance pressure sensors which provide analog signals having a variable magnitude (amplitude or frequency) representative of sensed pressure. Typically a variable frequency signal is initially produced with the frequency related to sensed pressure, and then a corresponding variable amplitude analog signal is produced by a frequency to amplitude converter.

In addition, the engine control system 10 also contemplates an engine position sensor 19 which provides a series of output pulses at a terminal 20, the occurrence of the pulses representative of the occurrence of predetermined engine crankshaft rotational positions. Typically sensors such as the sensor 19 comprise Hall effect or reluctance sensors which sense the passage of projections affixed to or rotated synchronously with the engine crankshaft.

The terminals 16 and 18 are directly coupled as inputs to an analog to digital (A/D) converter 21 which receives the analog signals at the terminals 16 and 18 and provides corresponding digital signals, directly related to the magnitudes of the analog signals, at corresponding respective terminals 22 and 23. The converter 21 is needed when the signals at the terminals 16 and 18 comprise analog signals having more than two different possible amplitude or frequency states and it is desired to translate that information into standard multibit digital signals at the terminals 22 and 23 with each bit having only two possible states. The terminal 22 is directly coupled as an input to a transfer function circuit 24 which can comprise an effective two or three dimensional read only memory (ROM). The output of the transfer function circuit 24 is provided at a terminal 25 and is directly, but preferably nonlinearly, related to the digital signal at the terminal 22. The transfer function circuit 24 is used to effectively adjust the magnitude of the throttle signal at the terminal 22 so that the signal at terminal 25 will have magnitudes more directly approximating the magnitudes of a manifold pressure signal. The signals at the terminals 22 and 25 are both contemplated as having magnitudes which vary directly as a function of the magnitude of the analog throttle position sensor signal at the terminal 16. It should be noted that the signal at the terminal 25, even though a digital signal, still comprises a signal having high and low end magnitudes corresponding to the wide open and closed throttle positions, as well as at least a midrange magnitude corresponding to a middle range throttle position.

Figure 2:
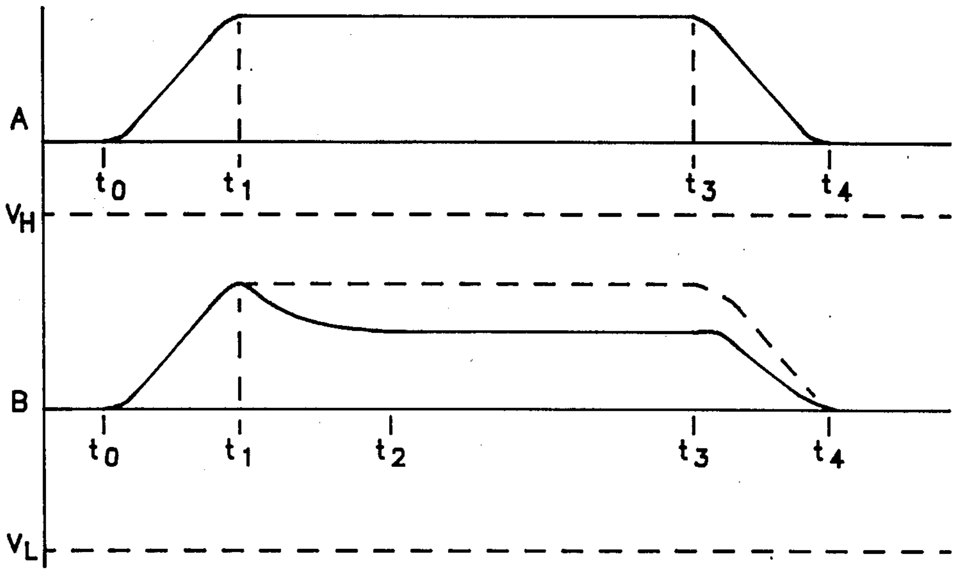
FIG. 2 is a series of graphs representative of engine sensor signals utilized by the fuel control system of FIG. 1.

The terminals 25 and 23 are received as inputs by a multiplex circuit 26 which provides a single output signal that is connected to the terminal 14. The circuit 26 also has a signal select control terminal 27. The function of the multiplex circuit 26 is to select which of the digital signals 25 and 23 will be coupled to the terminal 14 for utilization as the primary control signal to be utilized by the microprocessor 11. This selection process is accomplished in accordance with whether a high or low logic state signal is provided at the terminal 27. Multiplex selection circuits such as the circuit 26 are well known and are commonly available. In the control system 10 typically the multiplex circuit 26 will select, in response to a high logic signal at terminal 27, the sensed engine manifold sensor related signal at the terminal 23 for utilization as the primary control signal, unless a failure of the manifold pressure sensor is determined. In this event, the multiplex circuit 26 will select, in response to a low logic signal at terminal 27, the signal at the terminal 25, which is related to the analog throttle position sensor signal at the terminal 16, for utilization as the primary control signal provided at the terminal 14. The consequences of this selection can best be illustrated by referring to the graphs in FIG. 2.

FIG. 2A illustrates a waveform which corresponds to the magnitude versus time characteristic of the analog throttle position signal provided at the terminal 16. Prior to the time $t_o$ a closed position of the throttle is assumed. At the time to an acceleration transient is produced by depression of the throttle until an increased steady state throttle position is obtained at a time $t_1$. This throttle position is maintained until a time $t_3$ at which time the throttle is released and it returns to the closed throttle position at a subsequent time $t_4$. FIG. 2B illustrates a waveform which represents, on the same time scale as the waveform in FIG. 2A, the sensed engine manifold pressure signal at the terminal 18 provided in response to the same throttle position movement which created the signal waveform shown in FIG. 2A.

It should be noted that the times and rates of increase and decrease of the waveforms in FIGS. 2A and 2B substantially track each other with the exception that the pressure sensor signal waveform shown in FIG. 2B may, as illustrated by solid line in FIG. 2B, decrease to a reduced nominal value during the time $t_1$ to $t_2$ or, as illustrated in dashed line in FIG. 2B, it may maintain a constant magnitude between the times $t_1$ and $t_3$. The reduction in the magnitude of the sensed engine manifold pressure waveform occurs when the engine throttle is displaced from a closed throttle position to a less than a fully wide open throttle position. This results in an increase in engine manifold pressure followed by a decrease after the engine has obtained sufficient speed. If the throttle position had been varied from closed throttle to fully wide open throttle and maintained thereat then the magnitude of the engine manifold pressure would remain constant between the times $t_1$ and $t_3$ indicating that the engine was continuously operating at maximum load. In either event it should be noted that the substitution of a signal based on the analog throttle position signal waveform shown in FIG. 2A for the engine manifold pressure signal waveform shown in FIG. 2B will at most result in over estimating the fuel requirements for the engine while still substantially tracking the rates of acceleration and deceleration caused by depression and release of the throttle. Differences in the rates of change of the throttle position and pressure waveforms and differences in their absolute magnitudes can be compensated for by the transfer function circuit 24. Thus substituting a signal which is a function of throttle position for the pressure signal in the event of a pressure sensor failure, which substitution is implemented by the present invention, has been found to provide a much more desirable engine fuel control characteristic than that provided by prior art systems. Thus the present invention, in the event of a pressure sensor failure, effectively makes the primary control signal at the terminal 14 a function of the analog pressure sensor signal at the terminal 16. The manner in which the present invention determines a failure of the pressure sensor 17 will now be discussed.

The terminal 18 at which the analog engine manifold pressure signal is provided is contemplated as being directly coupled to the positive input terminal of a comparator 28 and the negative input terminal of a comparator 29. While FIG. 1 illustrates connection of the terminal 18 to these comparators, it should be noted that the present invention also functions properly if the digital pressure signal at the terminal 23 is connected to these comparators rather than the analog pressure signal at the terminal 18. The negative input terminal of comparator 28 is coupled to a fixed high reference voltage $V_H$ representative of a high threshold value limit of the analog signal at the terminal 18 which will normally not be exceeded by this signal. Similarly, the positive input of the comparator 29 is connected to a fixed low voltage level $V_L$ which corresponds to the lowest normal expected value of the analog signal at the terminal 18.

The outputs of the comparators 28 and 29 are coupled as inputs to an OR gate 30 which provides an output to a reset on low input terminal 31 of a counter 32. The output of the counter 32 is provided at an output terminal 33 which is coupled as an input to a count comparator 34 that compares the count of the counter to a fixed predetermined count and provides an output at a terminal 35. The terminal 35 is directly connected to the select terminal 27 of the multiplex circuit 26 and to a warning device 36 which will be activated in response to a pressure sensor failure signal at terminal 35 to provide the engine operator with a warning which indicates the failure of the pressure sensor. The terminal 35 is coupled as an input to an inverter 37 which has its output coupled as an input to the OR gate 30, and the terminal 35 is also coupled as an input to an AND gate 38 having its output coupled to a pulse count input terminal 39 of the counter 32.

An input pulse terminal 40 is coupled as an additional input to the AND gate 38. The terminal 40 receives signals from the output of a zero cross detector circuit 41 that has its input coupled to the terminal 20 at which engine position sensor signals are provided by the sensor 19. The detector 41 is used to insure that transitions in the signals at terminal 20 result in signal transitions at terminal 40. Alternatively, the pulse signals at the terminal 40 can be provided by connecting the terminal to a clock circuit 42 which provides periodic clock pulses to the terminal 40. The function of the circuits 41 and 42 is merely to provide pulses at the terminal 40 which enable the present invention to measure a predetermined time interval. This is accomplished by selectively passing the pulses at the terminal 40 through the AND gate 38 to the counter 32 prior to the detection of any engine manifold pressure sensor failure.

Normally the counter 32 will receive the pulses at the terminal 39 and attempt to increment the count of the counter. However, if the magnitude of the engine manifold pressure sensor signal at the terminal 18 is within the end limits $V_H$ and $V_L$, the OR gate 30 maintains the effective count of the counter 32 at zero. This continues until the magnitude of the pressure signal at the terminal 18, or alternatively at the terminal 23, exceeds the end limits $V_H$ or $V_L$. If this occurs, then the count of the counter 32 will be incremented by pulses passing through the AND gate 38. The counter 32 will continue to be incremented until the predetermined reference threshold count utilized by the count comparator 34 is obtained by the counter 32. Once this occurs the count comparator 34 provides a low logic signal at the terminal 35, whereas previously a high logic signal was provided thereat. This low logic signal at the terminal 35 results in disabling the AND gate 38 such that the counter 32 can no longer be incremented by pulses occuring at the terminal 40. In addition, the low logic signal at the terminal 35, by means of the converter 37 and the OR gate 30 insures that the counter 37 will not be reset in case the magnitude of the pressure sensor signal at the terminal 18 subsequently falls within the limits defined by $V_H$ and $V_L$. Thus the present invention contemplates a latch up circuit to maintain, in the event of a detected pressure sensor failure, a low logic signal at the terminal 35 regardless of the subsequent magnitude of the sensed engine manifold pressure signal at the terminal 18.

It should be noted that the reason the present invention contemplates using the counter 32 and count comparator 34 is that it is desired to insure that out of limit readings of the analog pressure sensor signal at the terminal 18 really do indicate a failure of the manifold pressure sensor. This is accomplished by requiring the occurrence of a number of sequential time related pulses at the terminal 40 to exist while the signal at the terminal 18 is out of limits before a pressure sensor failure condition is determined. This number of required time related pulses defineds the "time interval" during which the pressure sensor signal must be out of limits before a pressure sensor failure is validly detected. The "time interval" is preferably calibrated to be of sufficient duration such that pressure sensor faults can be reliably detected, and yet not so long as to cause an engine stall during this interval in which the pressure signal is out of limits and the function of throttle position has not yet been substituted. The circuitry in FIG. 1 of the present embodiment provides for this result.

Figure 4:
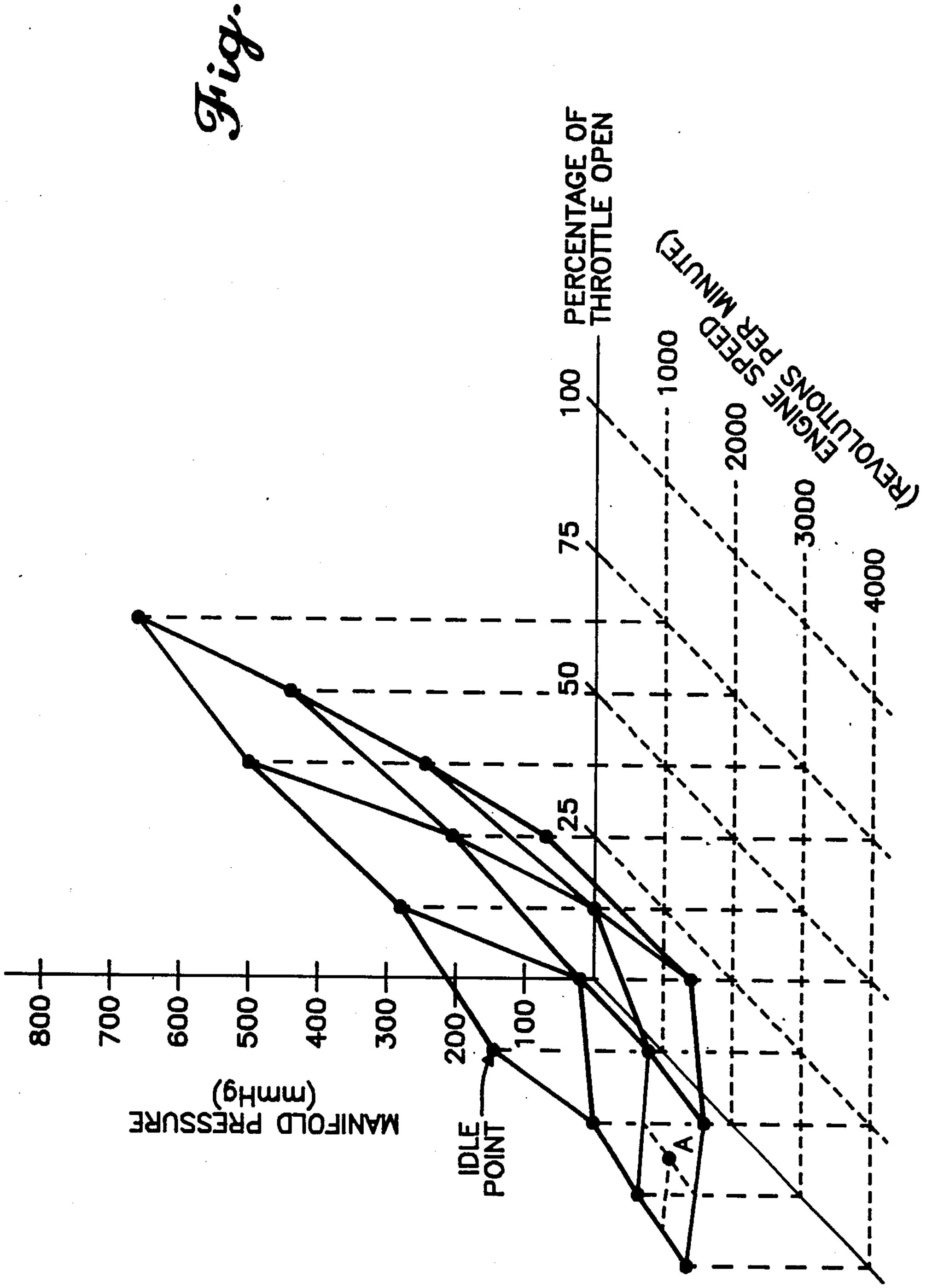
FIG. 4 is a graph illustrating a typical three dimensional relationship which exists between manifold pressure, throttle position and engine speed.

As was previously noted, the present invention provides for having the transfer function circuit 24 provide a signal at the terminal 25 which, in the event of a detected pressure sensor failure, will be utilized as the primay fuel control signal provided at the terminal 14. As was noted, because of the similar varying nature of the parameters of manifold pressure and throttle position, the transfer function circuit 24 essentially performs a table look up function by responding to the throttle position signal at the terminal 22 and providing, in response thereto, the signal at the terminal 25. However, it has been noted that a signal having an improved correspondence to actual manifold pressure can be synthesized if at least both throttle position and engine speed are taken into account. This is best illustrated by referring to FIG. 4 which is a three dimensional map of a typical engine charisteristic in which the parameters of manifold pressure, percentage of throttle opening (which is directly related to throttle position of course) and engine speed are plotted. As can be seen, a specific relationship exists between these three parameters such that given throttle position and engine speed, a close approximation to manifold pressure can be obtained. Because of this an improved version of the present invention involves having the transfer function circuit 24 effectively implement a three dimensional mapping by receiving a throttle position input signal at the terminal 22 and also receiving an engine speed signal at an input terminal 71. In response to both of these signals the transfer function circuit 24 can implement a predetermined three dimensional table look up and synthesize the substitute manifold pressure sensor signal at the terminal 25. It should be noted that in some instances it may not be necessary to provide the additional input of an engine speed signal to the transfer function circuit 24, but providing this engine speed signal improves the accuracy of the substitute manifold pressure signal present at the terminal 25.

In order to generate the engine speed signal at the terminal 71, an engine speed circuit 70 is provided which receives an input by virtue of a direct connection to the terminal 40 which is contemplated as receiving its input from the zero cross detector 41. With this configuration the input to the engine speed circuit 70 comprises engine crankshaft pulses produced by the sensor 19, the frequency of which is of course related to engine speed. The function of the engine speed circuit 70 is to receive engine speed related signal pulses and provide a corresponding engine speed signal at the terminal 71, preferably a digital signal representative of engine speed. This can readily be accomplished by utilizing a frequency to amplitude converter circuit, and such circuits are well known. Typically the variable frequency signal would first be converted to a variable amplitude analog signal and then, through the use of a analog to digital converter, into a digital signal provided at the terminal 71.

If the sensor 19 is a Hall effect sensor instead of a reluctance sensor, then a zero crossing detector circuit, such as detector 41, may not be necessary. In that case the output of the Hall effect sensor can be directly provided as an input to the engine speed circuit 70.

With regard to the transfer function circuit 24, it should be noted that three dimensional table look ups responding to two different inputs and providing an output signal in response thereto are well known. Preferably the present invention contemplates implementing linear interpolation between fixed reference points which define the relationship between throttle position, engine speed and manifold pressure, wherein these fixed reference points would be stored in the transfer function circuit 24. This type of interpolation technique is well known and readily implementable through the use of microprocessor technology. Thus, for example the transfer function circuit 24 can respond to a 12.5 percent throttle opening and a 3500 RPM engine speed and calculate a resultant manifold pressure corresponding to the point A illustrated in FIG. 4. Such interpolation techniques are well known and essentially merely involve linear interpolation between two fixed points wherein these fixed points determine the relationship between the input and output variables. It should be noted that the specific characteristic of any particular engine will determine the shape of the engine parameter characteristics shown in FIG. 4, and that therefore this will have to be empirically calculated for each type of engine. The set points of the characteristic shown in FIG. 4, corresponding to the heavily shaded dots present in FIG. 4, would then be stored in a memory portion of the transfer function circuit 24 to be subsequently recalled and utilized in subsequent calculations.

As was previously noted, the flowcharts illustrated in FIGS. *3a* and *3b* represent computer program flowcharts which can be utilized to program the microprocessor 11 to implement the signal selection and engine manifold pressure failure detection functions provided by the hardware embodiment shown in FIG. 1. The flowcharts in FIGS. *3a* and *3b* correspond to a preferred embodiment of the present invention rather than the utilization of the circuit elements 24 through 42 shown in FIG. 1. A brief description of the flowcharts shown in FIGS. *3a* and *3b* will now be given. It should also be noted that preferably the microprocessor 11 can utilize standard techniques to implement the table look up and linear interpolation functions of the transfer function circuit 24, and may also be used to implement the function of the analog to digital converter 21.

Prior to having the microprocessor 11 calculate a control signal for implementing a desired amount of fuel, or a desired spark timing or any other pressure dependent control function, the manifold air pressure (MAP) validation routine shown in FIG. *3a* is executed. The initializing step of this routine is identified by the reference numeral 50. The process flow from the initializing block 50 passes to a decision block 51 which determines if a failure of the engine manifold pressure sensor has previously been determined. Essentially this is accomplished by looking at whether a MAP signal fault flag had been previously set in the program. If so, the process flow passes directly to a process block 52 which determines that the magnitude of the throttle position sensor signal, and also preferably an engine speed signal, should be utilized, rather than the magnitude of the manifold pressure sensor signal, for calculations and controlling various engine functions. Process flow then proceeds to other portions of the microprocessor program designated by a continue block 53.

The above described flowchart operations correspond to the low logic signal at the terminal 35 in FIG. 1 creating a latch up situation and resulting in the multiplex circuit 26 selecting the signal at the terminal 25, related to throttle position, rather than the signal at the terminal 23 related to sensed engine manifold sensor.

If the decision block 51 determines that a pressure sensor failure has not been previously determined, then process flow passes to a decision block 54 which inquires if the sensed engine manifold pressure is above the high threshold limit. This limit can be set to correspond to the absolute pressure found well below sea level. If sensed pressure is above this limit, this indicates a potential MAP sensor failure and process flow passes to another decision block 55 which essentially inquires if the MAP fault counter, corresponding to the counter 32, has been incremented to its threshold limit, which corresponds to the reference threshold count utilized by the count comparator 34. If this has not yet occurred, then process flow passes to the process block 56 which acknowledges that a validated pressure sensor failure has not yet occurred. This results in the continued use of a signal related to the sensed MAP by the microprocessor 11 for determining engine operations. This is indicated by the process flow passing from the process block 56 to the continue block 53.

If the sensed MAP is below the maximum limit for MAP, then process flow passes from the decision block 54 to a decision block 57 which inquires if the sensed MAP is below a lower threshold limit which corresponds to the greatest engine vacuum pressure achievable under normal operating circumstances, including severe deceleration. If the sensed MAP signal is below this limit, this also indicates a potential MAP failure and again process flow passes to the decision block 55. If the sensed MAP signal is within the high and low limits of the decision blocks 54 and 57, then process flow passes to a process block 58 which results in clearing the MAP counter of any previous count it had. This corresponds to the OR gate 30 resetting the counter 32. After this is accomplished process flow then proceeds to the process block 56 which insures the continue use of the sensed manifold pressure signal until a pressure sensor failure is detected.

The key to detecting a pressure sensor failure is the decision block 55 determining that the MAP fault counter, corresponding to the counter 32, has been incremented to at least its limit count while the sensed MAP signal was either above or below its high or low limit value, respectively. If this occurs, the process flow from the decision block 55 passes to a process block 59 that sets the "MAP fault signal" which in turn results in having a subsequent process block 60 turn on a warning alert for the operator, the process flow proceeding from the process block 60 to the process block 52 which requires the use of the substitute throttle position signal in place of the sensed engine manifold pressure signal.

The flowchart in FIG. *3b* comprises an interrupt routine to be utilized along with the flowchart in FIG. *3b*. Preferably this routine is entered at the occurrence of a time related event such as the occurrence of a clock pulse or the occurrence of an engine position pulse. The entering of the routine is indicated by the initializing block 61. After the block 61, process flow passes to a decision block 62 which determines if the sensed manifold pressure is out of limit (either above or below the maximum and minimum pressure limits). If so, the MAP fault counter is incremented one count by a process block 63 and control passes to a return block 64 wherein the microprocessor 11 resumes its calculations. If the decision block 62 determines that the sensed pressure is not out of limits, then control directly passes to the return block 64.

Figure 3B:
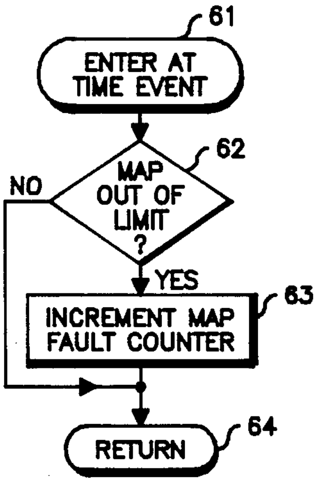
Figure 3A:
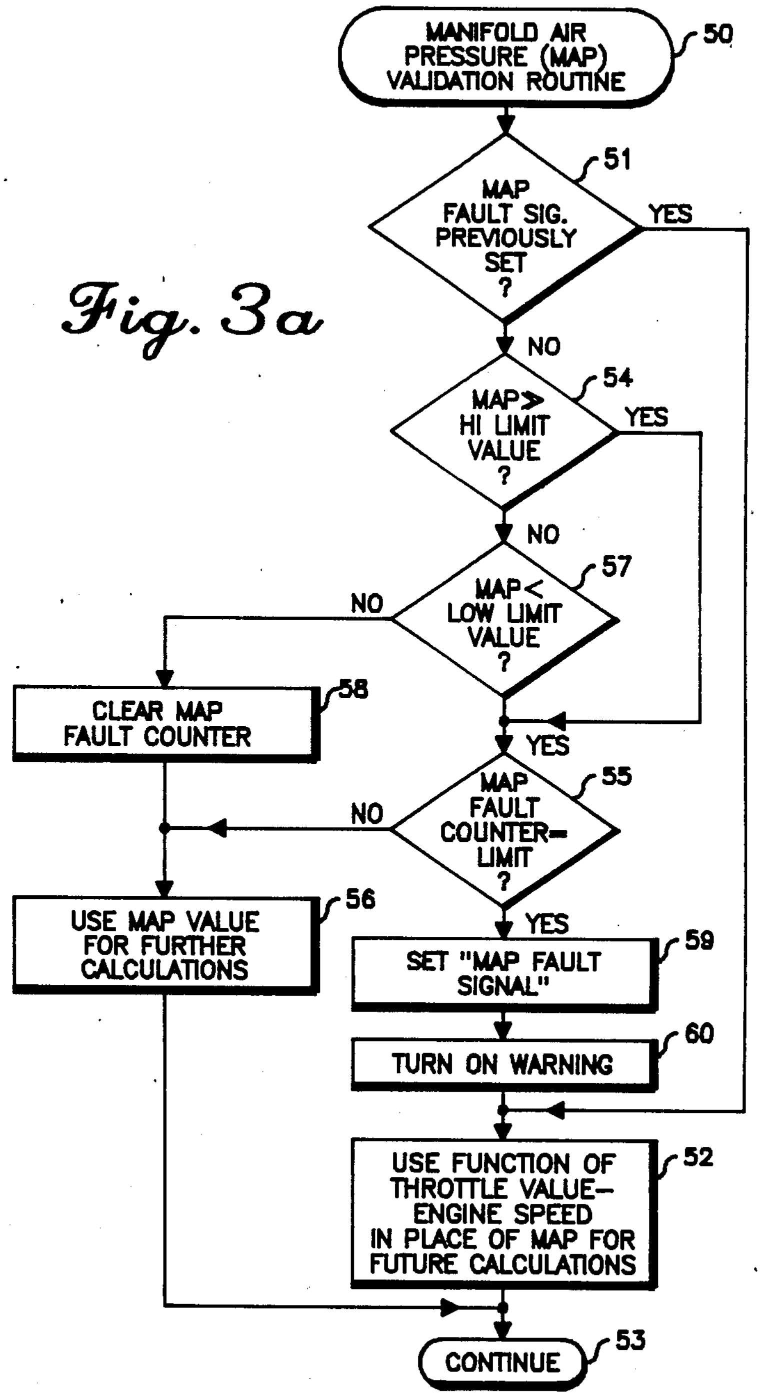

It should be noted that the flowchart in FIG. *3b* is an independent procedure with respect to the MAP routine in FIG. *3a* and that the essence of the flowchart in FIG. *3b* is to implement the predetermined time interval during which the sensed manifold absolute pressure must be out of limits before a pressure sensor failure is detetermined resulting in the selection of the throttle position signal, rather than the sensed pressure signal, for use in engine control calculations by the microprocessor. This time interval corresponds to the number of time related events which must occur while MAP is beyond its limits to increment the MAP counter to its limit value. It should be noted that it is contemplated that the flowchart in FIG. 3*b* will be executed no more than once for every execution of the flowchart in FIG. 3*a*, and vice versa such that the count of the MAP counter is not incremented several times before the decision block 55 investigates the count of the MAP counter.

By substituting, in the event of a detected failure of the manifold pressure sensor, a primary control signal determined by at least the analog throttle position sensor signal, rather than the manifold pressure sensor signal, the present invention has provided an improved engine fuel control system. This system is further improved by taking into account engine speed when calculating the substitute primary control signal when the pressure sensor fails. While we have shown and described specific embodiments of this invention, further modifications and improvements will occur to those skilled in the art. All such modifications which retain the basic underlying principles disclosed and claimed herein are within the scope of this invention.

What is claimed is:

1. An engine fuel control system comprising:

sensor means for providing separate more than two state electrical signals representative of the sensed engine parameters of engine throttle position and engine manifold pressure;

fuel control means for receiving at least a primary control signal and providing a calculated engine fuel control signal as a function thereof;

sensor signal conditioning circuit means coupled to said sensor means for receiving at least one of said electrical signals representative of sensed engine throttle position and sensed engine manifold pressure and providing, in response thereto, said primary control signal to said fuel control means;

wherein the improvement comprises, failure detection means, included in said sensor signal conditioning circuit means, for determining when said engine manifold pressure sensor signal is nonrepresentative of actual engine manifold pressure and for providing a pressure sensor failure signal in response thereto, said sensor signal conditioning circuit means normally effectively providing a signal having magnitudes determined by at least said sensed manifold pressure signal to said fuel control means as said primary control signal in response to the absence of said pressure sensor failure signal, but effectively providing a different signal having magnitudes determined by at least said throttle position sensor signal, rather than being determined by said sensed manifold pressure signal, to said fuel control means as said primary control signal in response to the existence of said pressure sensor failure signal indicating a failure of the manifold pressure sensor, said different signal having high and low end magnitudes corresponding to high and low end magnitudes of said throttle position signal, and at least a middle range magnitude corresponding to a middle range magnitude of said throttle position signal, whereby in the event of a pressure sensor failure said primary fuel control signal will vary as a function of the more than two state throttle position signal rather than the manifold pressure sensor signal.

2. An engine fuel control system according to claim 1 which includes an operator warning device which is activated in response to said pressure sensor failure signal indicating a failure of said pressure sensor.

3. An engine fuel control system according to claim 1 wherein said failure detection means comprises means for monitoring the magnitude of said engine manifold pressure sensor signal and providing said pressure sensor failure signal in response to the passage of a predetermined time interval during which said engine manifold pressure sensor signal is outside of a normal range of pressure signal magnitudes bounded by predetermined high and low threshold value limits.

4. An engine fuel control system according to claim 3 wherein the failure detection means includes a counter means which is incremented in response to the occurrence of predetermined time occurrences which create pulses counted by said counter means, and wherein said counter means provides said pressure sensor failure signal in response to the count of said counter means exceeding a predetermined threshold count, the count of said counter means being effectively reset in the absence of said pressure sensor failure signal in response to the magnitude of said manifold pressure sensor signal being between said predetermined threshold value limits.

5. An engine fuel control system according to claim 4 wherein the count of said counter means is effectively prevented from being reset and further incremented in response to the count of said counter exceeding said threshold count.

6. An engine fuel control system according to claim 4 wherein said counter means effectively maintains said pressure sensor failure signal after its creation regardless of the subsequent magnitude of said sensed manifold pressure signal.

7. An engine fuel control system according to claim 1 wherein said failure detection means comprises means for monitoring the magnitude of said engine manifold pressure sensor signal and providing said pressure sensor failure signal in response to a predetermined number of engine revolutions during which said engine manifold pressure sensor signal is outside of a normal range of pressure signal magnitudes bounded by predetermined high and low threshold value limits.

8. An engine fuel control system according to claim 7 wherein the failure detection means includes a counter means which is incremented in response to the occurrence of predetermined engine rotational positions which create pulses counted by said counter means, and wherein said counter means provides said pressure sensor failure signal in response to the count of said counter means exceeding a predetermined threshold count, the count of said counter means being reset in the absence of said pressure sensor failure signal in response to the magnitude of said manifold pressure sensor signal being between said predetermined threshold value limits.

9. An engine fuel control system according to claim 8 wherein the count of said counter means is effectively prevented from being reset and further incremented in response to the count of said counter means exceeding said threshold count.

10. An engine fuel control system according to claim 9 wherein said counter means effectively maintains said pressure sensor failure signal after its creation regardless of the subsequent magnitude of said sensed manifold pressure signal.

11. An engine fuel control system comprising:

sensor means for providing separate more than two state electrical signals representative of the sensed engine parameters of engine throttle position and engine manifold pressure;

fuel control means for receiving at least a primary control signal and providing a calculated engine fuel control signal as a function thereof;

sensor signal conditioning circuit means coupled to said sensor means for receiving at least one of said electrical signals representative of sensed engine throttle position and sensed engine manifold pressure and providing, in response thereto, said primary control signal to said fuel control means;

wherein the improvement comprises, failure detection means, included in said sensor signal conditioning circuit means, for determining when said engine manifold pressure sensor signal is non-representative of actual engine manifold pressure and for providing a pressure sensor failure signal in response thereto, said sensor signal conditioning circuit means normally effectively providing a signal having magnitudes determined by at least said sensed manifold pressure signal to said fuel control means as said primary control signal in response to the absence of said pressure sensor failure signal, but effectively providing a different signal having magnitudes determined by at least said throttle position sensor signal and a signal representative of engine speed, rather than being determined by said sensed manifold pressure signal, to said fuel control means as said primary control signal in response to the existence of said pressure sensor failure signal indicating a failure of the manifold pressure sensor, said different signal having high and low end magnitudes corresponding to high and low end magnitudes of said throttle position signal, and at least a middle range magnitude corresponding to a middle range magnitude of said throttle position signal, whereby in the event of a pressure sensor failure said primary fuel control signal will vary as a function of the more than two state throttle position signal rather than the manifold pressure sensor signal, said system including an operator warning device which is activated in response to said pressure sensor failure signal indicating a failure of said pressure sensor, wherein said failure detection means comprises means for monitoring the magnitude of said engine manifold pressure sensor signal and providing said pressure sensor failure signal in response to the passage of a predetermined time interval during which said engine manifold pressure sensor signal is outside of a normal range of pressure signal magnitudes bounded by predetermined high and low threshold value limits, and wherein the failure detection means includes a counter means which is incremented in response to the occurrence of predetermined time occurrences which create pulses counted by said counter means, and wherein said counter means provides said pressure sensor failure signal in response to the count of said counter means exceeding a predetermined threshold count, the count of said counter means being effectively reset in the absence of said pressure sensor failure signal in response to the magnitude of said manifold pressure sensor signal being between said predetermined threshold value limits.

12. An engine fuel control system according to claim 11 wherein the count of said counter means is effectively prevented from being reset and further incremented in response to the count of said counter exceeding said threshold count.

13. An engine fuel control system according to claim 11 wherein said counter means effectively maintains said pressure sensor failure signal after its creation regardless of the subsequent magnitude of said sensed manifold pressure signal.

14. An engine fuel control system comprising:

sensor means for providing separate more than two state electrical signals representative of the sensed engine parameters of engine throttle position and engine manifold pressure;

fuel control means for receiving at least a primary control signal and providing a calculated engine fuel control signal as a function thereof;

sensor signal conditioning circuit means coupled to said sensor means for receiving at least one of said electrical signals representative of sensed engine throttle position and sensed engine manifold pressure and providing, in response thereto, said primary control signal to said fuel control means;

wherein the improvement comprises, failure detection means, included in said sensor signal conditioning circuit means, for determining when said engine manifold pressure sensor signal is non-representative of actual engine manifold pressure and for providing a pressure sensor failure signal in response thereto, said sensor signal conditioning circuit means normally effectively providing a signal having magnitudes determined by at least said sensed manifold pressure signal to said fuel control means as said primary control signal in response to the absence of said pressure sensor failure signal, but effectively providing a different signal having magnitudes determined by at least said throttle position sensor signal and a signal representative of engine speed, rather than being determined by said sensed manifold pressure signal, to said fuel control means as said primary control signal in response to the existence of said pressure sensor failure signal indicating a failure of the manifold pressure sensor, said different signal having high and low end magnitudes corresponding to high and low end magnitudes of said throttle position signal, and at least middle range magnitude corresponding to a middle range magnitude of said throttle position signal, whereby in the event of a pressure sensor failure said primary fuel control signal will vary as a function of the more than two state throttle position signal rather than the manifold pressure sensor signal, wherein said failure detection means comprises means for monitoring the magnitudes of said engine manifold pressure sensor signal and providing said pressure sensor failure signal in response to a predetermined number of engine revolutions during which said engine manifold pressure sensor signal is outside of a normal range of pressure signal magnitudes bounded by predetermined high and low threshold value limits.

15. An engine fuel control system according to claim 14 wherein the failure detection means includes a counter means which is incremented in response to the occurrence of predetermined engine rotational positions which create pulses counted by said counter means, and wherein said counter means provides said pressure sensor failure signal in response to the count of said counter means exceeding a predetermined threshold count, the count of said counter means being reset in the absence of said pressure sensor failure signal in response to the magnitude of said manifold pressure sensor signal being between said predetermined threshold value limits.

16. An engine fuel control system according to claim 15 wherein the count of said counter means is effectively prevented from being reset and further incremented in response to the count of said counter means exceeding said threshold count.

17. An engine fuel control system according to claim 16 wherein said counter means effectively maintains said pressure sensor failure signal after its creation regardless of the subsequent magnitude of said sensed manifold pressure signal.

* * * * *